US010871908B2

(12) United States Patent
Dailey et al.

(10) Patent No.: US 10,871,908 B2
(45) Date of Patent: Dec. 22, 2020

(54) STORAGE BYPASS DRIVER OPERATION IN A HIGHLY AVAILABLE COMPUTER SYSTEM

(71) Applicants: Nathaniel H Dailey, Stow, MA (US); Angel Pagan, Holden, MA (US); Stephen J Wark, Shrewsbury, MA (US)

(72) Inventors: Nathaniel H Dailey, Stow, MA (US); Angel Pagan, Holden, MA (US); Stephen J Wark, Shrewsbury, MA (US)

(73) Assignee: Stratus Technologies Ireland, Ltd., Dublin (IE)

( * ) Notice: Subject to any disclaimer, the term of this patent is extended or adjusted under 35 U.S.C. 154(b) by 0 days.

(21) Appl. No.: 16/393,576

(22) Filed: Apr. 24, 2019

(65) Prior Publication Data
US 2020/0341665 A1    Oct. 29, 2020

(51) Int. Cl.
*G06F 12/00*    (2006.01)
*G06F 3/06*    (2006.01)

(52) U.S. Cl.
CPC ............ *G06F 3/0635* (2013.01); *G06F 3/061* (2013.01); *G06F 3/0619* (2013.01); *G06F 3/0683* (2013.01)

(58) Field of Classification Search
CPC ............................... G06F 3/0635; G06F 3/061
See application file for complete search history.

(56) References Cited

U.S. PATENT DOCUMENTS

2019/0042371 A1\*  2/2019  Sipka ...................... G06F 3/067

\* cited by examiner

*Primary Examiner* — Baboucarr Faal
(74) *Attorney, Agent, or Firm* — Robert Schuler

(57) ABSTRACT

A highly available computer system has a primary compute node and a secondary compute node, both of which operate to support at least one similar process using the same instructions and the same information at substantially the same time, and in the event that the secondary compute node generates a read request that is not able to be serviced by cache memory local to it, then the secondary compute node redirects the read request to the primary compute node for servicing.

13 Claims, 4 Drawing Sheets

STORAGE BYPASS DRIVER OPERATION IN A HIGHLY AVAILABLE COMPUTER SYSTEM

1. FIELD OF THE INVENTION

The invention relates to an efficient checkpoint operation in a prototype highly available computer system.

2. BACKGROUND

There are a variety of computer configurations that can operate to provide highly-available processes for clients. Specifically, hardware and software techniques can be used either alone or in some combination to provide such highly available processes. As an example, two (or more) physical computers (compute nodes) can be connected to each other such that an active, primary node can fail-over to an active, secondary node in the event that the primary node is unable to continue supporting client processes, i.e., an application, in an error free manner, or at all. In this configuration, the processes running on the primary node are connected to clients and the same processes running on the active, secondary node are not connected to clients, and both nodes operate using the same instructions and the same information at substantially the same time.

For a pair of compute nodes to function in a highly available computer system, the operating state, memory and data storage contents of the secondary node should be equivalent to the operating state, memory and data storage contents of the primary node. If this condition is met, the secondary node is able to transition to become a primary node and take over processes being supported by the formerly primary node in an uninterrupted manner that is transparent to clients that receive information associated with the processes (i.e., without the loss of any data). To assure that the state of the secondary node and its memory are equivalent to the state of the primary node and its memory, it is necessary for the active, primary node to periodically transfer at least some of its state to the active, secondary node.

The periodic exchange of state to maintain synchrony between a primary and a secondary node in a highly available computer system is termed checkpointing. A checkpoint cycle comprises the following steps: notify network and storage interface devices that a checkpoint is pending, pause the operating systems (OS) on both the primary and secondary nodes, obtain lists of memory modified on primary and secondary nodes since the last checkpoint, sending a union of the modified memory list from the primary to the secondary node, capture processor (and other device) state and send to the secondary node, inform network interfaces on primary and secondary nodes that the checkpoint operation is completed, and resume the operating system execution on the primary and secondary nodes. This cycle repeats with each checkpoint operation, defining a potential starting point for the secondary operating system in the event of a failure of the primary node.

Virtualization is used in many areas to reduce the number of physical resources needed to perform particular functionality. In this regard, a single, physical host computer system can be designed to operate as though multiple different computers are operating on different processes at the same time. This is typically accomplished by operating multiple virtual computers or virtual machines (VM) as guests within a physical host computer, or node. Each virtual machine can run under the control of its own virtual machine monitor (i.e., hypervisor) executing on the host computer. Each virtual machine can execute one or more processes or applications, and access physical data storage and computer networks as required by the applications. In this regard, a prior art, highly-available computer system having two nodes, node 1 and node 2, each of which supports the operation of one or more virtual machines is illustrated with reference to FIG. 1.

FIG. 1 is a diagram showing a prior art highly-available computer system architecture 100 having two nodes, node 1 and node 2, both of which are active but only node 1 is connected to clients over an external network. Each node is comprised of, among other things, one or more virtual machines (VM) that operate under the control of a virtual machine manager (not shown) to run processes associated with program instructions the results of which can be sent over the external network to clients. In the course of running the processes, system calls are sent to the OS which causes an I/O subsystem to generate I/O requests which are sent to a storage driver. The storage driver operates within the operating system to, among other things, support the CP process and to process I/O requests to mass storage to determine how they should be serviced. Specifically, the storage driver caches write requests to storage between checkpoint operations, it caches pages maintained in mass storage that are frequently access by processes, and it operates to identify read request misses to cache, and to direct this request, via the host bus adapter (HBA) to the mass storage device, N1 or N2 to be serviced. The node 1 in FIG. 1 is shown to be connected to an external network over which it communicates with a client device, while node 2 is shown to not be connected to the external network. Each of the nodes in FIG. 1 also have a checkpoint engine that operates to determine when a checkpoint cycle should be called, and to manage the steps in the checkpoint cycle that result in the transfer of state from the primary node, node 1 in this case, to the secondary node. An internal network connection between the two nodes is employed for this state transfer between nodes.

As previously described, identifying state (i.e., node 1 or 2 hardware state) that needs to be transferred from a primary node to a secondary node during a checkpoint operation is determined by experimentation, and depending upon the complexity of the system, the identification of hardware state that has to be transferred so that the secondary node can assume a primary node role can be time consuming.

3. BRIEF DESCRIPTION OF THE DRAWINGS

4. DETAILED DESCRIPTION

Figure 1:
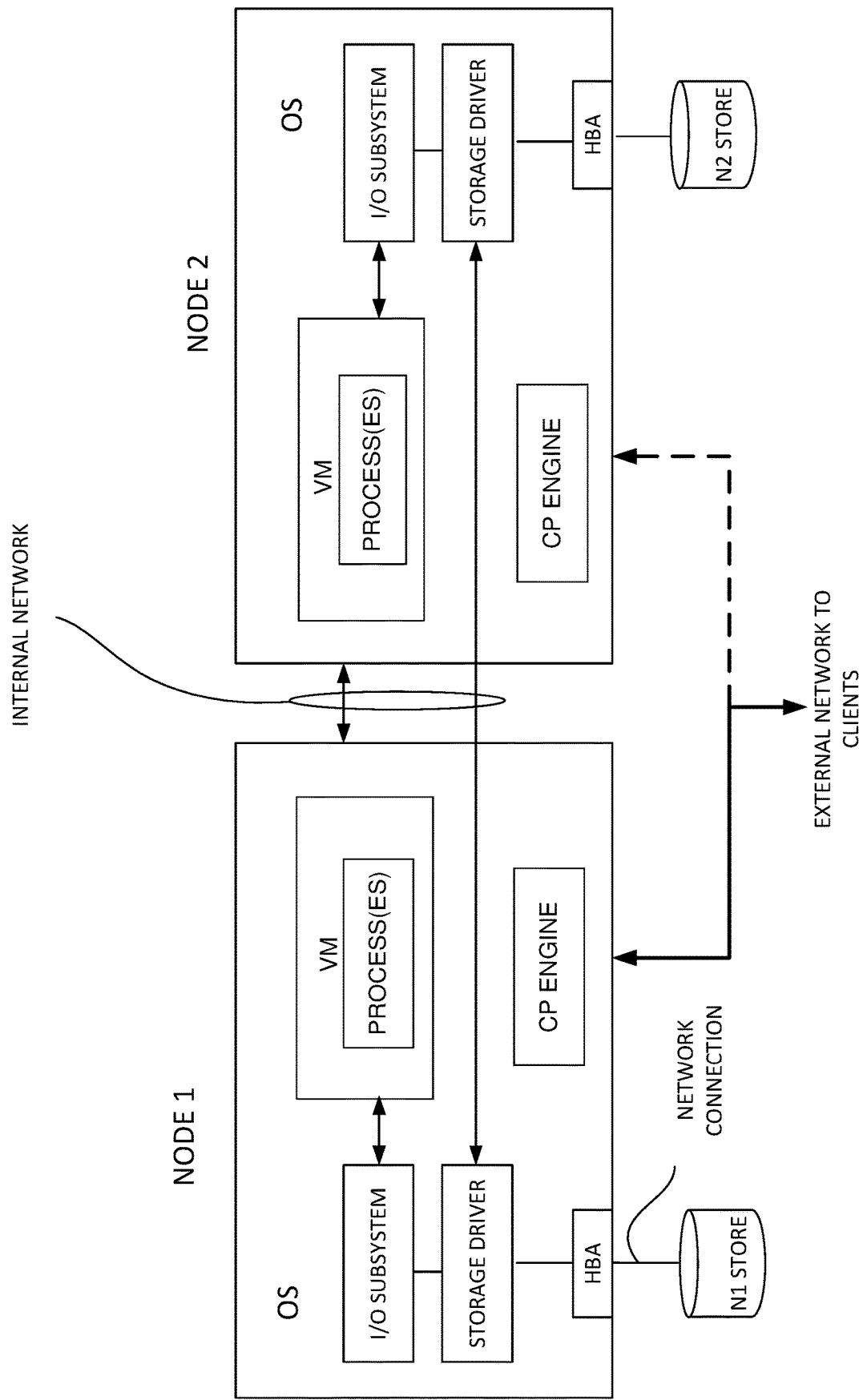
FIG. 1 is a block diagram showing functionality comprising a prior art highly available computer system.

During the time a checkpoint operation is being performed, the operating system (OS) running on a primary and secondary node (host computational device) in a highly available configuration is paused, and during this pause some, but not necessarily all, of the current state associated with the primary node can be transferred to the secondary node. An objective during a CP operation is to transfer at least enough of the primary node state to the secondary node such that it can take over running a process from the primary in an error free manner in the event the primary is no longer able to run the process. From the perspective of a process running on a highly-available computer system, an event that results in a fail-over from the primary to the secondary node is transparent, and the process continues to run on the secondary node without the loss of any data as if a primary node failure never occurred. Another objective of the CP operation is to perform the operation in a minimum amount of time. In order to minimize the CP operation time, it is incumbent upon system designers to identify only that state which is needed by a secondary node to take over running processes from the primary node in the event of a fail-over from the primary to the secondary node. Identifying which state on the primary node needs to be transferred, and which state does not need to be transferred can be determined empirically during the system prototype design process, and this empirical process can be time consuming, resulting in extending the prototype design time, and possibly delaying the introduction of new products to the marketplace.

In lieu of the above problems experienced during a prototype design process associated with a highly available computer system, we have discovered that it is not necessary to transfer all of a primary node state to a secondary node during a checkpoint operation running on a prototype system. In this regard, we have designed special storage driver functionality which is implemented on both primary and second nodes of a highly available computer system. The special storage driver on the secondary node operates to detect I/O reads that may be serviced from cache memory associated with the storage driver, and if a read cannot be serviced by the local cache (read miss), a read request is redirected to the primary node which services the read request from the primary node mass storage space. Redirecting I/O reads from the secondary node to the primary node in this manner allows system developers to use a single mass storage image during the prototype system development process. This redirection of read misses simplifies the prototype development process by saving time to identify storage device hardware registers or other state, saving time needed to develop code to resync storage media between the primary and the secondary nodes, and saving time needed to perform a storage media resync from the primary to the secondary nodes, therefore accelerating the rate of prototype development.

Figure 2:
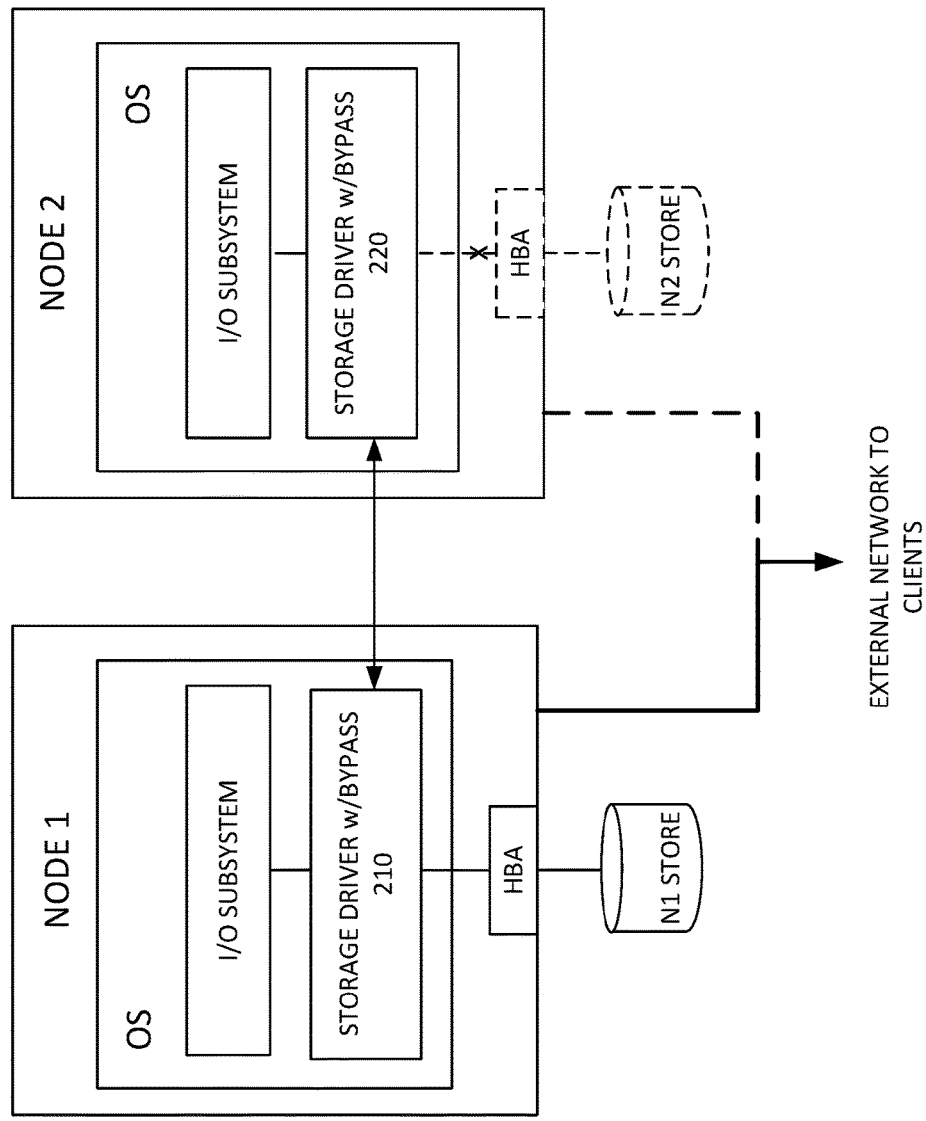
FIG. 2 is a block diagram showing functionality comprising a highly available computer system according to one embodiment.

FIG. 2 is a block diagram showing functionality comprising a highly available (HA) computer system 200 having the special storage driver described above. The system 200 is comprised of two host computational devices labeled Node 1 and Node 2, and both nodes are similar to the nodes described with reference to FIG. 1 with the exception that the storage drivers implemented on each node in FIG. 2 have storage bypass functionality. This storage bypass functionality operates in the storage driver 220 comprising a secondary node (node 2 in FIG. 2) to identify I/O read misses, and instead of sending the read misses to a mass storage device (N2 Store) dedicated to Node 2, it redirects the read misses (in the form of a read message) to the storage driver 210 comprising the primary node, Node 1 in this case, to be serviced using mass storage dedicated to Node 1. The storage drivers 210 and 220 are referred to hereinafter as storage bypass drivers or SB drivers. Generally, the SB driver 220 services I/O reads to mass storage from cache (not shown) maintained by the SB driver, but if the information being requested is not maintained in cache (a read miss), then these read misses are redirected to the primary node (N1) mass storage device for servicing. Operating in this manner, processes running on Node 1 and Node 2 access information maintained in the same mass storage device (N1 STORE in this case) which allows a prototype system developer the freedom to delay the process of experimentally determining what state needs to be transferred during a CP operation until a prototype system is operational, which has the effect of accelerating the prototype system development process.

Figure 3:
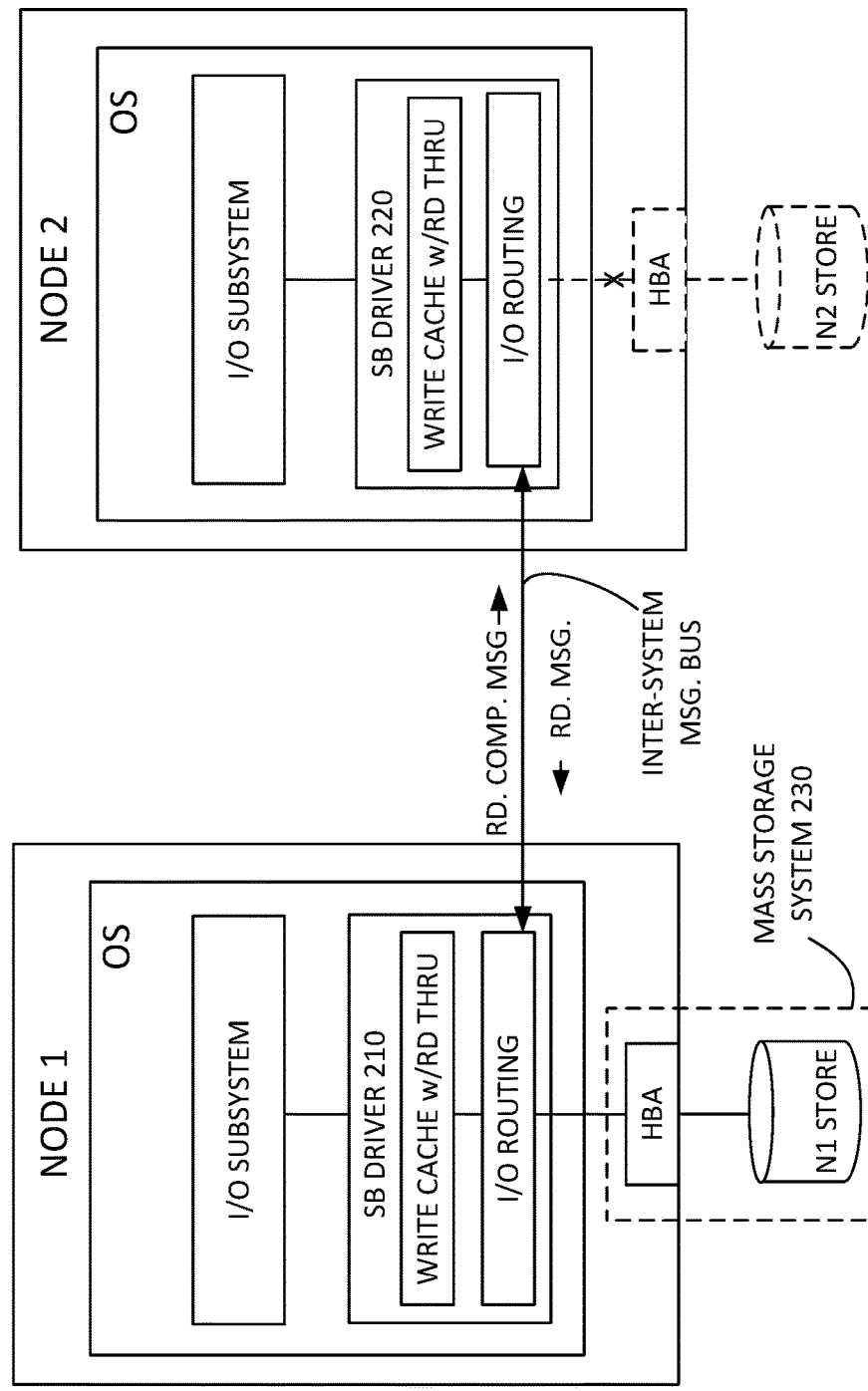
FIG. 3 is a block diagram showing the functionality in FIG. 2 in greater detail.

FIG. 3 is a diagram showing the same HA computer system 200 described with reference to FIG. 2, but showing the SB drivers in more detail. Specifically, both SB drivers 210 and 220 have cache for maintaining write requests. Write requests are stored in cache local to the SB driver 210 until a next CP operation, as these writes would be visible to the secondary node, Node 2 in this case, and could corrupt a process running on this node. At the time a checkpoint operation is completed, write requests cached by the SB driver are committed to the N1 store as soon as possible. As with the operation of the SB driver 210 on Node 1, the SB driver 220 on Node 2 stores write requests generated between checkpoint operations in local cache, but in contrast to the operation of the SB driver on Node 1, the driver on Node 2 deletes all of these cached write requests during a checkpoint operation, as the secondary node only uses information maintained on the N1 store on Node 1, therefor it is not necessary to maintain an up-to-date image in the N2 store.

As described earlier with reference to FIG. 2, read requests generated by the I/O subsystems on Nodes 1 and 2 are serviced using cache local to the SB drivers 210 and 220, and read requests generated by the I/O subsystem on Node 1 that cannot be serviced from the SB driver 210 cache are serviced using information maintained in the N1 store. However, read requests generated by the Node 2 I/O subsystem that cannot be serviced (read miss) from cache local to SB driver 220, are serviced using information maintained in the N1 store. In this regard, the I/O routing functionality comprising the SB driver 220 operates to detect these read misses and redirects them to the SB driver 210 I/O functionality on Node 1. The N1 store in FIG. 3 comprises a mass storage system 230 having the N1 store and a host bus adapter (HBA). According to an embodiment, the storage system 230 can be a solid-state mass storage device, such as a Non-Volatile Memory express (NVMe) device, that connects to the Node 1 host over a PCIe bus. It should be understood that the subsystem 230 can be any type of mass storage device or system that is capable of supporting processes running on the host.

Continuing to refer to FIG. 3, the I/O subsystems comprising each OS on Nodes 1 and 2 maintain separate file systems, and state associated with the file system comprising the I/O subsystem running on Node 1 is transferred to the file system maintained on the secondary node, Node 2 in this case. In operation, the I/O subsystem running on the secondary node generates an I/O request, such as a read request, and sends this request to an SB driver, SB driver 220 for example, where it can be temporarily stored (queued) at an address received from the SB driver waiting to be operated on by the driver. The SB driver then processes the next queued read request to determine whether the requested sector(s) are maintained in the devices local cache or not. In the case that the sector information is maintained in local cache (cache hit), then cached sector data is returned to the requesting process. In the event that the memory address and sector information is not stored in the local cache (cache miss), then the SB driver 220 on the secondary node (Node 2) generates a read message having message type information (read or read completion message type), a device memory address, the original read memory address information, disk starting sector number and number of sectors to read, and sends the read message to the SB driver 210 running on the primary node (Node 1) via a communication link such as an inter-system messaging bus. The primary SB driver uses the device memory address information in the read message received from the secondary to access the drivers cache memory. Sectors found in the N1 cache are used to service the N2 read request, and sectors not found in N1 cache are read from the primary mass storage (N1 in this case). Upon the successful completion of the read, the primary SB driver generates a read completion message that has the device memory address, the original read request memory address received from the secondary, the read status (successful/unsuccessful) and the read information, and sends this read completion message to the secondary SB driver. A process for detecting a read miss on the secondary node and redirecting the miss to the primary node for servicing, referred to herein as the storage bypass process, can be implemented in the I/O routing functionality comprising each of the SB drivers 210 and 220.

The logical instructions used to implement the storage bypass process will now be described with reference to the logical flow diagram shown FIG. 4. These instructions can be maintained in any appropriate non-transitory computer readable medium associated with each SB driver. At 400, the process starts with the secondary node I/O subsystem generating an I/O request, which among other things can be a read or a write request. At 405 the secondary SB driver can detect the I/O request generated at 400 in a queue (i.e., FIFO) and at 410 the driver determines if the request is a read or a write request. If a read request is detected, the process proceeds to 420 where it determines whether or not the read can be serviced by the cache local to the SB driver. If the read can be serviced by local cache, then at 425 the SB driver completes the read request to the I/O subsystem. On the other hand, if at 420 the SB driver determines that the read is not able to be serviced by the local cache (a read miss), then at 422 the logic determines whether a first CP operation has been performed by the system 400, and if so the process proceeds to 430 and the secondary SB driver generates and sends a read message to the primary node SB driver over the inter-system messaging bus, and at 435 the primary SB driver processes the read message, and uses the device memory location and disk starting sector number and number of sectors to read from the primary cache if possible (only if the sectors were cached during the previous CP interval), or in the case of a cache miss, the read message is serviced from the primary node mass storage, and the primary SB driver generates a read completion message. At 440 the primary SB driver sends the read completion message to the secondary SB driver to complete the original read request. At 450 the process returns to 410.

Figure 4:
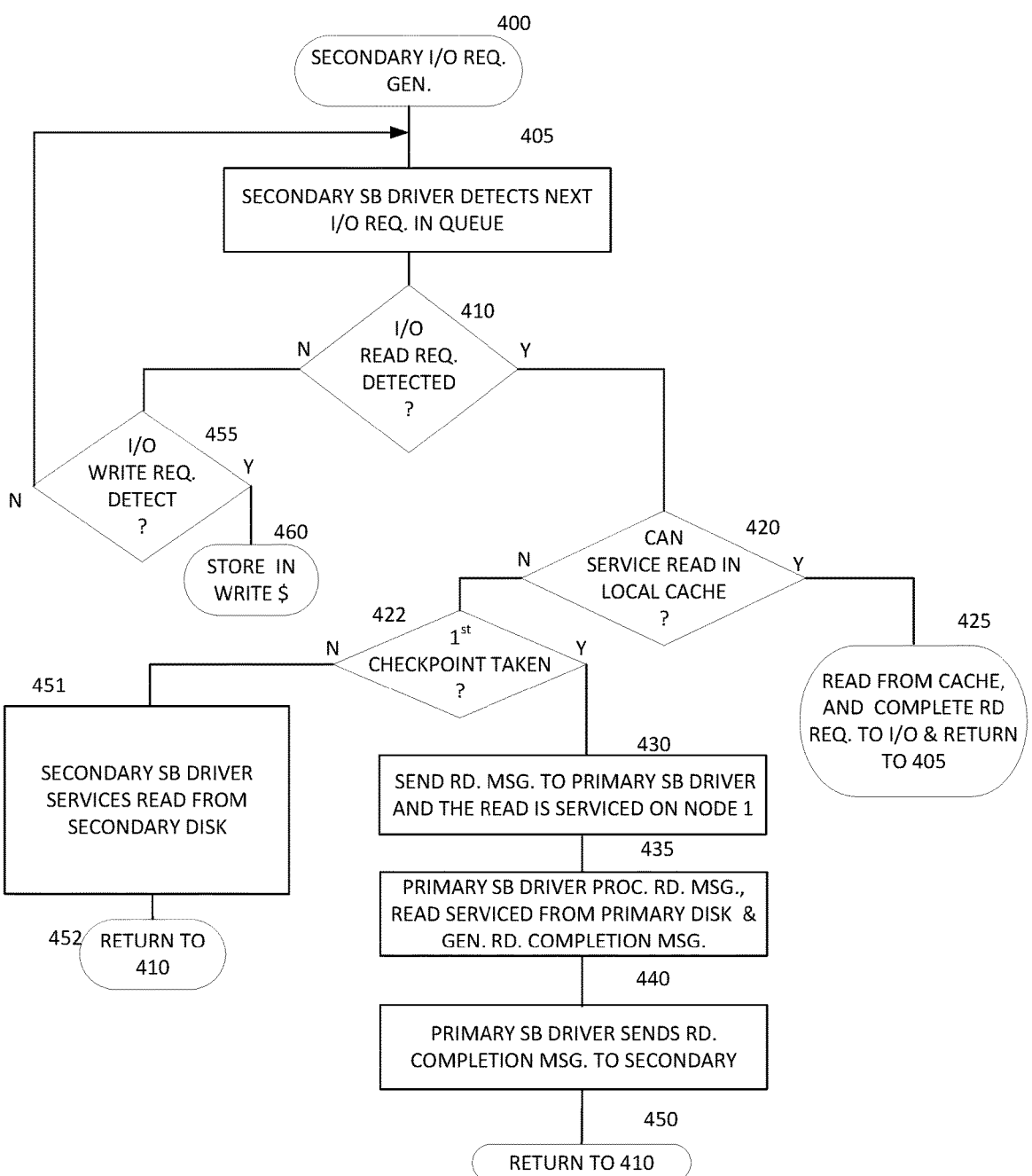
FIG. 4 is a logical flow diagram of a process followed to redirect read request messages from a secondary to a primary node.

Continuing to refer to FIG. 4, and referring back to 422, in the event that the logic determines that the first CP operation has not yet been performed, then the process proceeds to 451 and the secondary SB driver services the read request from the secondary mass storage sub-system.

Referring back to 410 in FIG. 4, if at this point the logic determines that the I/O request is not a read request, then the process proceeds to 455 where the logic determines whether the I/O request is a write request or not. If it is a write request, then this request is stored in write cache on the secondary SB driver until the next CP operation, at which point the request is deleted from cache. On the other hand, if the logic determines that a request other than a write is detected, then the process returns to 410.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention,

We claim:

1. A method for operating a prototype, highly available computer system during a time that the computer system is not running a check-point operation, comprising:

prior to an initial checkpoint operation after starting the computer system, detecting a read request by a secondary compute node comprising the highly available computer system, determining that the read request is not able to be serviced from local cache memory and servicing the read request from mass storage dedicated to the secondary compute node;

after the initial and all subsequent checkpoint operations are completed, a read request generated by the secondary compute node that not able to be serviced from local cache memory is redirected to a primary compute node comprising the highly available computer system; and receiving, at the primary compute node, the redirected read request and servicing the read request from mass storage dedicated to it, and sending a read completion message to the secondary compute node;

wherein each of the primary and secondary compute nodes support at least one similar process using the same instructions and the same information at substantially the same time.

2. The method of claim 1, further comprising the secondary compute node having a storage driver that operates to detect the read request and to determine that the read request is not able to be serviced from the cache memory that is local to the secondary node.

3. The method of claim 2, wherein the storage driver receives the read request from an input/output subsystem comprising the secondary compute node.

4. The method of claim 3, wherein the storage driver generates a read message that is used to service the read request.

5. The method of claim 1, wherein the redirected read request is sent to a storage driver comprising the primary compute node over a messaging bus connecting the primary to the secondary compute node.

6. A method for operating a prototype highly available computer system during a time that the computer system is not running a checkpoint operation, comprising:

prior to an initial checkpoint operation after starting the computer system, detecting a read request by a secondary compute node comprising the highly available computer system, determining that the read request is not able to be serviced from cache memory that is local to the secondary compute node and servicing the read request from mass storage dedicated to the secondary compute node;

after the initial and all subsequent checkpoint operations are completed, a read request generated by the secondary compute node that is not able to be serviced from local cache memory is redirected to the primary compute node; and receiving a response from the primary compute node indicating that the redirected read request is successfully completed;

wherein each of the primary and the secondary compute nodes support at least one similar process using the same instructions and the same information at substantially the same time.

7. The method of claim 6, further comprising the secondary compute node having a storage driver that operates to detect the read request and to determine that the read request is not able to be serviced from cache memory that is local to the secondary node.

8. The method of claim 7, wherein the storage driver receives the read request from an input/output subsystem comprising the secondary compute node.

9. The method of claim 6, wherein the redirected read request is sent to a storage driver comprising the primary compute node over a messaging bus connecting the primary to the secondary compute node.

10. A prototype highly available computer system, comprising:

primary and secondary compute nodes each of which have separate mass storage systems and support at least one similar process using the same instructions and the same information at substantially the same time;

the secondary compute node having a storage driver that operates during a time that the computer system is not running a checkpoint operation and prior to an initial checkpoint operation after starting the computer system, to detect read requests, determine that a detected read request is not able to be serviced from cache memory that is local to the secondary compute node, and redirecting the read request to the primary compute node; and the primary compute node receiving the redirected read request, servicing the read request from the mass storage dedicated to it and generating and sending a read completion message to the secondary compute node.

11. The system of claim 10, further comprising the secondary compute node having a storage driver that operates to detect the read request and to determine that the read request is not able to be serviced from cache memory that is local to the secondary node.

12. The system of claim 11, wherein the storage driver receives the read request from an input/output subsystem comprising the secondary compute node.

13. The system of claim 10, wherein to a storage driver comprising the primary compute node received the redirected read request over a messaging bus connecting the primary to the secondary compute node.

* * * * *